United States Patent [19]

Efford

[11] Patent Number: 4,939,204

[45] Date of Patent: Jul. 3, 1990

[54] PROCESS FOR PREPARING STATIC DISSIPATIVE LINEAR SEGMENTED POLYURETHANES

[75] Inventor: Elizabeth A. Efford, Pittsburg, Calif.

[73] Assignee: The Dow Chemical Company, Midland, Mich.

[21] Appl. No.: 266,178

[22] Filed: Nov. 2, 1988

Related U.S. Application Data

[63] Continuation-in-part of Ser. No. 95,379, Sep. 10, 1987, abandoned, which is a continuation of Ser. No. 938,222, Dec. 5, 1986, abandoned.

[51] Int. Cl.$^5$ .............................................. C08G 18/14
[52] U.S. Cl. .................................... 524/701; 524/746; 524/912
[58] Field of Search ............... 524/701, 912, 184, 746; 528/66

[56] References Cited

U.S. PATENT DOCUMENTS

| | | | |
|---|---|---|---|
| 4,532,316 | 7/1985 | Henn | 528/59 |
| 4,617,325 | 10/1986 | Knobel et al. | 524/701 |
| 4,806,571 | 2/1989 | Knobel et al. | 524/746 |

Primary Examiner—Lewis T. Jacobs

[57] ABSTRACT

This invention is an improvement in a process for preparing an static dissipative phase-segregated polyurethane polymer wherein a polyfunctional polyether and a chain extender are reacted with an organic polyisocyanate in the presence of about 500 to 10,000 parts per million metal tetraorganoboron salt or fluorinated alkylsulfonate salt, based on the weight of the polyurethane. The improvement comprises dissolving said salt in all or a portion of said chain extender prior to contacting said chain extender with said polyfunctional polyether and said polyisocyanate.

This process provides a phase-segregated polyurethane having excellent static dissipative properties.

16 Claims, No Drawings

PROCESS FOR PREPARING STATIC DISSIPATIVE LINEAR SEGMENTED POLYURETHANES

CROSS REFERENCE TO RELATED APPLICATION

This is a continuation-in-part of application Ser. No. 095,379, filed Sept. 10, 1987, now abandoned which is a continuation of application Ser. No. 938,222, filed 12/5/86, now abandoned.

BACKGROUND OF THE INVENTION

This invention relates to static dissipative phase-segregated thermoplastic polyurethanes.

Phase-segregated polyurethanes are useful in a variety of applications such as blood bags, catheters and other medical uses, as well as for films, packaging, and the like. Because of their excellent physical properties, they would also be excellent packaging materials for materials such as electronics components. However, electronics components and similar materials are often quite sensitive to damage from static electrical discharges, and their packaging must usually have the ability to dissipate static charges. Previously known phase-segregated polyurethanes have not had the requisite static dissipative behavior.

It has recently been discovered that the incorporation of certain ionizable salts into the polyurethane could improve its static dissipative properties. However, it has been found that in many instances, the salts are not compatible with the polyurethane This causes difficulties in making the polyurethane and results in the polyurethane having static dissipative properties which are less than anticipated. This problem is overcome in some instances with the use of an enhancer compound, which compatibilizes the salt with the polymer and enhances the static dissipative effect of the salt. Enhancers such as certain non-ionizable salts or esters of carboxylic acids and certain phosphate esters are described in U.S. Pat. Nos. 4,617,325 and 4,618,630. However, the use of these enhancers often causes undesirable changes in the physical properties of the polyurethane.

It would be desirable to provide a process whereby a phase-segregated polyurethane having excellent static decay properties is prepared.

SUMMARY OF THE INVENTION

This invention is an improvement in a process for preparing an static dissipative phase-segregated polyurethane polymer wherein a polyfunctional polyether containing repeating oxyethylene units and a chain extender are reacted with an organic polyisocyanate in the presence of about 500 to 10,000 parts per million metal tetraorganoboron or fluorinated alkyl sulfonate salt, based on the weight of the polyurethane, and in the presence of less than 0.5 moles of a non-ionizable salt or ester of a carboxylic acid or a phosphate ester per mole of tetraorganoboron or fluorinated alkyl sulfonate salt. The improvement comprises dissolving said tetraorganoboron or fluorinated alkyl sulfonate salt in all or a portion of said chain extender prior to contacting said chain extender with said polyfunctional polyether and said polyisocyanate.

This process provides a phase-segregated polyurethane having excellent static dissipative properties. A major advantage of this process is that when the tetraorganoboron or fluorinated alkyl sulfonate salt is incorporated into the polyurethane in this manner, it is more uniformly distributed than with other processes, thereby providing more effective static dissipative properties per given quantity of tetraorganoboron or fluorinated alkyl sulfonate salt. As a result, surprisingly good static dissipative properties are obtained with very low amounts of tetraorganoboron or fluorinated alkyl sulfonate salt.

DETAILED DESCRIPTION OF THE INVENTION

According to this invention, an static dissipative polyurethane is prepared by reacting a polyether polyol, a polyisocyanate and a chain extender in the presence of a monovalent metal tetraorganoboron or fluorinated alkyl sulfonate salt which is previously dissolved in all or a portion of the chain extender.

The polyether polyol employed herein advantageously has an equivalent weight from about 700 to about 3000, preferably about 800 to about 2000. It is advantageously prepared by polymerizing ethylene oxide with a $C_3$–$C_6$ $\alpha,\beta$-alkylene oxide, tetrahydrofuran, or other cyclic compound capable of undergoing a ring-opening reaction in the presence of a polyhydric initiator to form a polyether. Preferably, a $C_2$–$C_4$ alkylene oxide, is copolymerized with ethylene oxide to form a random interpolymer or a block copolymer. Most preferably, the polyether polyol is formed by polymerizing propylene oxide in the presence of a polyhydric initiator, and then reacting this product with a small quantity of ethylene oxide (i.e., about 8 to about 25 percent of the total weight of the polyol) to provide a significant quantity of terminal primary hydroxyl groups to the polyether. If the polyether polyol is a polymer of a $C_4$ or higher cyclic compound, it advantageously contains about 20 to about 50%, based on the weight of the polyol, of repeating units derived from ethylene oxide.

Suitable polyhydric initiators have from about 2 to about 8, preferably about 2 to about 4, active hydrogen atoms per molecule. Suitable dihydric initiators include water, ethylene glycol, diethylene glycol, triethylene glycol, propylene glycol, dipropylene glycol, tripropylene glycol, methyldiethanolamine, ethyldiethanolamine, methyldipropanolamine, ethyldipropanolamine, low equivalent weight polypropylene oxide glycols, and the like. Mixtures of these initiators can be used. Trihydric initiators include glycerine, trimethylolpropane, ammonia, triethanolamine, triisopropanolamine and the like. Other, higher functional initiators include ethylene diamine, pentaerythritol, sucrose, sorbitol and the like.

It is further within the scope of this invention to employ a minor amount of a poly(ethylene oxide) in conjunction with a copolymer of ethylene oxide and a $C_3$–$C_6$ cyclic ether in order to improve the performance of the tetraorganoboron or fluorinated alkyl sulfonate salt. When such poly(ethylene oxide) polymer is used, it advantageously constitutes about 5 to about 25 percent of the total weight of the polyethers employed.

Both aliphatic and aromatic polyisocyanates are useful in this invention. However, certain of the tetraorganoboron salts tend to catalyze the trimerization reaction of more reactive polyisocyanates. For this reason, aliphatic polyisocyanates are generally preferred, particularly with respect to the linear segmented polyurethanes (LSPs) described hereinafter.

Suitable aromatic polyisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'-biphenylene diisocyanate, 3,3'-dimethoxy-4, 4'-biphenyldiisocyanate, 2,4'- and/or 4,4'-diphenylmethanediisocyanate (MDI) and derivatives thereof, and the like. Preferred among the aromatic polyisocyanates are the isomers of TDI and MDI.

Exemplary aliphatic polyisocyanates include isophorone diisocyanate, cyclohexane diisocyanate, hydrogenated diphenylmethanediisocyanate ($H_{12}MDI$), 1,6-hexamethylenediisocyanate and the like. Of these, isophorone diisocyanate and $H_{12}MDI$ are most preferred.

Biuret, urethane, urea and/or carbodiimide containing derivatives of the foregoing polyisocyanates are also suitable.

Suitable chain extenders include relatively low equivalent weight compounds (less than 250 equivalent weight) having at least two active hydrogen-containing groups per molecule. Preferably, the chain extender has about 2 to about 3, more preferably about 2, active hydrogen-containing groups per molecule. Most preferably, the chain extender is cyclohexanedimethanol or an $\alpha,\omega$-alkylene glycol or glycol ether having an equivalent weight of less than about 200. Particularly preferred chain extenders include ethylene glycol, diethylene glycol, 1,4-butanediol, triethylene glycol, cyclohexanedimethanol and the like.

In all or a portion of the chain extender is dissolved a monovalent metal tetraorganoboron or fluorinated alkyl sulfonate salt. Preferably, the monovalent metal is an alkali metal and more preferably, it is sodium or potassium. The anion is preferably tetraalkylboron, tetraphenylboron, or a $C_1$–$C_{12}$ fluorinated alkyl sulfonate. When a tetraalkylboron anion is used, the alkyl groups are preferably unsubstituted or inertly substituted $C_1$–$C_6$ alkyl groups. The fluorinated alkyl sulfonate salt contains at least one fluorine atom, preferably a plurality of fluorine atoms, and is most preferably perfluorinated. The fluorinated alkyl sulfonate salt also preferably contains about 1 to about 6, more preferably about 1 to about 4 carbon atoms. The alkali metal tetraphenylboron salts and perfluorinated $C_1$–$C_4$ alkyl sulfonates are particularly preferred, and sodium tetraphenylboron and sodium trifluoromethyl sulfonate are the most preferred salts. The salt is used in an amount to provide about 500 to about 10,000, preferably 1000 to about 7500, parts by weight of the salt per million parts polymer.

As mentioned before, the tetraorganoboron or fluorinated alkyl sulfonate salt salt can be dissolved in all of the chain extender. However, it is often more convenient to prepare and use a stock salt/chain extender solution and supplement this solution as needed by adding additional chain extender to the polyurethane formulation. In practice, this permits the ready preparation of polyurethanes having varying amounts of chain extender and salt without preparing multiple solutions. Typically, such stock solution contains from about 2 weight percent tetraorganoboron or fluorinated alkyl sulfonate salt up to the limit of solubility of the salt in the chain extender. Preferably, the chain extender solution contains about 3 to about 50, more preferably about 5 to about 25 percent by weight tetraorganoboron or fluorinated alkyl sulfonate salt salt.

The polyurethane can be prepared from the foregoing reactive components in either a one-shot process or by the two-shot, or prepolymer, process.

In the one-shot process, the polyisocyanate is simultaneously reacted with the polyether polyol and the chain extender. In such one-shot process, it is conventional to mix together all the reactive components, and additives as described hereinafter, except the polyisocyanate, and then react said mixture with the polyisocyanate. This permits the introduction of only two streams of material to the mold or reaction vessel. Occasionally, certain of the nonreactive additives may be mixed with the polyisocyanate. Alternatively, the various components may all be separately introduced in the mold or reaction vessel, or may be added in three or more streams.

In the two-shot process, all or a major portion of the polyether polyol is reacted with an excess of polyisocyanate in a first step to form a prepolymer or quasi-prepolymer. This prepolymer or quasi-prepolymer is then reacted with the chain extender, and any remaining polyether polyol, if any, to form the polyurethane polymer. A stoichiometric excess of the polyisocyanate is used in making the prepolymer or quasi-prepolymer. Advantageously, the resulting prepolymer or quasi-prepolymer has an isocyanate equivalent weight from about 250 to about 600, more preferably about 250 to about 450.

The reaction of the polyisocyanate and the polyether polyol is advantageously conducted at an elevated temperature in the presence of a catalyst as described hereinafter. The preparation of the prepolymer is advantageously conducted at a temperature of about 60° to about 100° C. for a time sufficient for substantially all of the active hydrogen-containing groups to react with the polyisocyanate. About 3 minutes to about 5 hours are generally sufficient for this purpose.

The resulting prepolymer or quasi-prepolymer is then reacted with the chain extender, which contains the dissolved tetraorganoboron or fluorinated alkyl sulfonate salt. Additional amounts of the polyether polyol may also be present during this reaction, but such amounts are minor compared with the amount of polyether polyol used in preparing the prepolymer. This reaction is advantageously catalyzed, and carried out at an elevated temperature, such as about 25 to about 100, preferably about 30° to about 80° C. The reaction of the prepolymer or quasi-prepolymer with the chain extender is typically carried out in a mold or an extruder. In order to maximize the use of the mold, it is common practice to cure the polyurethane in the mold only until it is sufficiently cured to maintain its shape. At that point, the typical practice is to demold the polyurethane and post-cure it outside of the mold. Such post-curing, when done, is typically conducted for about 30 minutes to about 24 hours at a temperature of about 40°–120° C. Such post-curing is not critical, however, and complete in-mold curing or room temperature post-cures may also be used.

As mentioned before, the various reactions between the isocyanate-reactive components and the polyisocyanate are advantageously catalyzed. Preferred catalysts include organometallic catalysts, especially organotin catalysts, and tertiary amine compounds. The preferred organotin catalysts include, for example, stannous octoate, dimethyltindilaurate, dibutyltindilaurate and the like. Suitable amine catalysts include triethylenediamine. About 0.0001 to about 0.5 part of the organometallic catalyst is advantageously used per 100 parts of reactive components. Tertiary amine catalysts are suitably employed in an amount from about 0.01 to about 2 parts per 100 parts of reactive components. Of course, other catalysts useful in catalyzing polyurethane reactions are also useful herein.

In addition to the foregoing components, other optional additives may be used in preparing the polyurethane. When a cellular polyurethane is desired, a blowing agent is advantageously incorporated into the reaction mixture. Such blowing agents include air, nitrogen, carbon dioxide, water, halogenated methanes such as methylene chloride, dichlorodifluoromethane and the like, the so-called "azo" blowing agents, and the like. Typically, a silicone or other surfactant is used in conjunction with the blowing agent to stabilize the foaming reaction mixture until it is sufficiently cured to maintain its cellular configuration. Preferably, the polyurethane is non-cellular or microcellular, having a density of about 0.85 g/cc or higher.

Other optional additives include pigments, fillers, reinforcing fibers, mold release agents, antioxidants, preservatives and the like.

The polyurethane is prepared in the presence of less than 0.5 mole of a non-ionizable carboxylic acid salt or ester or a phosphate ester. Surprisingly, it has been found that in the particular polyurethanes of interest herein, these "enhancer" compounds provide minimal beneficial effects on the static dissipative properties of the polyurethane, and have a significant adverse effect on physical properties. More preferably, the polyurethane is prepared in the presence of less than about 0.5, more preferably less than 0.1 parts by weight of these "enhancers" per 100 parts polyurethane, and most preferably, the polyurethane is prepared in the substantial absence thereof.

A polyurethane of particular interest is a linear segmented polyurethane (LSP). Such LSPs are prepared by reacting a substantially difunctional polyether polyol, preferably of about 800 to about 2500 equivalent weight, with a substantially difunctional polyisocyanate and a substantially difunctional chain extender. The polyether polyol is most preferably a poly(propylene oxide) diol, especially one which is end-capped with ethylene oxide to provide a substantial proportion of primary hydroxyl groups. The polyisocyanate is preferably aliphatic, with hydrogenated MDI and isophorone diisocyanate being especially preferred. Ethylene glycol and 1,4-butanediol are the most preferred chain extenders. Such LSPs, and methods for their production, are described in U.S. Pat. No. 4,621,113, incorporated by reference.

The static dissipative polyurethane of this invention is useful in many applications in which the dissipation of static electrical charges is desired. For the purposes of this invention, a polyurethane is "static dissipative" if it is capable of dissipating 99% of an applied static charge of ±5000 volts in less than 10 seconds. Preferably, it dissipates such a charge in less than 2 seconds and more preferably in less than 0.5 second. Sometimes, the time required to dissipate only 90% of such a charge is measured. Typically, it takes 2 to 2.5 times a long to dissipate 99% of an applied charge as it does to dissipate 90% of a like charge. Such static dissipative polyurethanes are useful, for example, in electronics components packaging, electronics cabinets, shoe soles, carpet backings, and the like.

The following examples are provided to illustrate the invention and not to limit the scope thereof. All parts and percentages are by weight unless otherwise indicated.

EXAMPLE 1

A solution of sodium tetraphenylboron in ethylene glycol is prepared by degassing and dewatering ethylene glycol at 90° C. for two hours at a pressure of less than 800 millitorr absolute. Sufficient sodium tetraphenylboron is added to the degassed ethylene glycol to make a 10% by weight solution. The solution is then degassed as before. The resulting solution is kept under a nitrogen pad.

A linear segmented polyurethane (LSP) is prepared by charging 356 grams of a 2000 molecular weight ethylene oxide-capped poly(propylene oxide) (Polyol A) to a suitable reactor and heating it, open to the air, until it becomes water-white in appearance. The polyol is then dewatered at 135° C. for one hour at a pressure of less than 800 millitorr absolute. To the hot, degassed polyol are added 240.6 grams of a hydrogenated MDI. The vacuum is reapplied and the mixture cooled to 65° C., at which time 32 microliters of stannous octoate are added. The temperature of the mixture rises upon addition of the stannous octoate. After 30 minutes, the reaction mixture is cooled to 65° C., and 130 grams of the resulting prepolymer are removed. To the remaining prepolymer are added 2.5 grams of Irganox 1076, a commercially available antioxidant, followed by degassing. The mixture is then cooled to below 40° C., and 25 grams of the sodium tetraphenylboron/ethylene glycol solution are added, followed by degassing. After cooling to 30° C., 10 grams of ethylene glycol are added, again followed by degassing. About 225 microliters of stannous octoate are added, and the mixture stirred until the exotherm reaches about 50° C. The reaction mixture is then poured into polypropylene pans to depths of 0.040" and 0.350" and sealed with aluminum foil. The pourings are cured overnight at 100° C. The resulting static dissipative LSP, referred to herein as Sample No. 1, contains about 5000 parts per million sodium tetraphenylboron.

Sample Nos. 2–4 are prepared in like manner, except the amounts of ethylene glycol and sodium tetraphenylboron solution are varied to provide LSPs having sodium tetraphenylboron levels of 3000 ppm, 1000 ppm and 500 ppm, respectively.

The ability of each of these Samples to dissipate a static charge is measured on an Electrotech Systems 406C static decay meter. The sample is conditioned at <15% relative humidity for at least 24 hours prior to testing. Each Sample is placed into the meter at 72° F. and charged to +5000 VDC at 14% relative humidity. The time required for the sample to dissipate 99% of this charge is measured. The shorter the time required, the better the ability of the sample to dissipate the charge, and the better the static dissipative character of the sample. The results of this testing are indicated in Table 1 following.

TABLE 1

| Sample No. | Thickness, mil | Amount Na(Ph)$_4$B, ppm | Decay Time, sec. |
|---|---|---|---|
| 1 | 40 | 5000 | 0.40 |
| 1 | 350 | 5000 | 0.11 |
| 2 | 40 | 3000 | 1.53 |
| 2 | 350 | 3000 | 0.16 |
| 3 | 40 | 1000 | 3.2 |
| 3 | 350 | 1000 | 0.42 |

TABLE 1-continued

| Sample No. | Thickness, mil | Amount Na(Ph)$_4$B, ppm | Decay Time, sec. |
|---|---|---|---|
| 4 | 40 | 500 | 6.05 |

As can be seen from the data in Table 1, excellent static dissipative properties are provided at low levels of sodium tetraphenylboron.

EXAMPLE 2

A solution of sodium tetraphenylboron is prepared by dissolving 14.33 grams of sodium tetraphenylboron into 500 g of degassed 1,4-butanediol.

Static dissipative linear segmented polyurethane No. 5 is prepared by blending together 1601.7 grams of Polyol A and 376.8 grams of a 488 equivalent weight polyester polyol (Polyol B), and heating under vacuum at 135° C. in the presence of air until the blend is water-white. The blend is cooled to about 80° C., and 1732.7 grams of H$_{12}$MDI and 0.21 cc of a catalyst solution as described in Example 1 are added, followed by heating at above 65° C. for one-half hour. A 130-gram portion of the resulting prepolymer is then removed. The remaining prepolymer is heated to 65° C., blended with 20 grams of the antioxidant described in Example 1, and the mixture degassed. After cooling to about 30° C., 430.8 grams of the sodium tetraphenylboron solution are added, followed by degassing. Then, 1.8 grams of the catalyst solution are added and the mixture stirred until it reaches a temperature of about 50° C., poured into pans and cured as described in Example 1. The resulting static dissipative LSP is tested for static decay time as described in Example 1. It requires 0.83 seconds for a 40 mil film to dissipate 99% of an applied static charge of 5000 volts direct current. A 350 mil film dissipates 99% of a like charge in 0.08 seconds.

Sample No. 5 is repeated, this time using Polyol A and Polyol B in a 0.6:0.4 molar proportion (Sample No. 6). Sample No. 6, as a 40 mil film, dissipates 99% of an applied 5000 VDC charge in 0.48 seconds. As a 350 mil film, it dissipates 99% of the charge in 0.08 seconds.

For comparison a prepolymer is prepared in similar manner by reacting Polyol A and H$_{12}$MDI at a 1:5.15 molar ratio. Sufficient sodium tetraphenylboron is added to the prepolymer at 50°-55° C. to provide a 0.6% solution thereof in the prepolymer. The crystals do not dissolve, even after heating at 100° C. for 4 hours and subsequently raising the temperature to 145° C.

EXAMPLE 3

Using the general procedure described in Example 2, static dissipative LSP Sample No. 7 is prepared from Polyol A, MDI and 1,4-butanediol at a molar ratio of 1:4.12:3. Sample No. 7 is formulated with 1000 ppm of sodium tetraphenylboron which is dissolved in the 1,4-butanediol prior to its reaction with the prepolymer. As a 40 mil film, Sample No. 7 dissipates 99% of a 5000 VDC charge in 0.05 seconds. As a 350 mil film, it dissipates the charge in 0.01 second.

EXAMPLE 4

A solution of 4.5 parts sodium trifluoromethylsulfonate (sodium triflate) and 99 parts degassed 1,4-butanediol is prepared by mixing the two materials at an elevated temperature until no sodium triflate crystals are visible.

Using the general procedure described in Example 2, static dissipative LSP Sample No. 8 is prepared from Polyol A, H$_{12}$MDI and the 1,4-butanediol/sodium triflate solution at a 1:4.12:3 molar ratio. The resulting polymer contains about 7500 parts per million sodium triflate. As a 350 mil film, Sample No. 8 dissipates 99% of a 5000 VDC charge in 0.04 seconds, and has a surface resistivity of $1 \times 10^{10}$ ohms/sq.

EXAMPLE 4

Using the general procedure described in Example 2, static dissipative LSP Sample No. 8 is prepared from Polyol A, a 600 molecular weight poly(ethylene oxide) glycol, H$_{12}$MDI and 1,4-butanediol in a 0.9:0.1:4.12:3 molar ratio. In making this sample, Polyol A and the poly(ethylene oxide) glycol are blended and used to make the prepolymer. Sample No. 8 is formulated with 3000 ppm of sodium tetraphenylboron which is dissolved in the 1,4-butanediol prior to its reaction with the prepolymer. As a 40 mil film, Sample No. 8 exhibits a static decay time of 0.31 seconds.

What is claimed is:

1. In a process for preparing an static dissipative phase-segregated polyurethane polymer wherein a polyfunctional polyether containing repeating oxyethylene units and a chain extender are reacted with an organic polyisocyanate in the presence of about 500 to 10,000 parts per million metal tetraorganoboron or fluorinated alkyl sulfonate salt, based on the weight of the polyurethane, the improvement comprising dissolving said tetraorganoboron or fluorinated alkyl sulfonate salt in all or a portion of said chain extender prior to contacting said chain extender with said polyfunctional polyether and said polyisocyanate.

2. The process of claim 1 wherein said chain extender is an α,ω-alkylene glycol or glycol ether.

3. The process of claim 2 wherein said polyether has a functionality of about 2 to about 4 and an equivalent weight of about 800 to about 2500.

4. The process of claim 3 wherein said organic polyisocyanate comprises an aliphatic polyisocyanate having an average functionality of about 2.

5. The process of claim 4 wherein the tetraorganoboron or fluorinated alkyl sulfonate salt is a tetraphenylboron salt.

6. The process of claim 2 wherein said polyether and polyisocyanate are reacted in a first step to form an isocyanate-terminated prepolymer or quasi-prepolymer, and said prepolymer or quasi-prepolymer is subsequently reacted with said chain extender to form the polyurethane polymer.

7. The process of claim 2 wherein said tetraorganoboron or fluorinated alkyl sulfonate salt comprises an alkali metal tetraphenylboron salt.

8. The process of claim 7 wherein said polyether, chain extender and polyisocyanate are substantially difunctional.

9. The process of claim 8 wherein said polyisocyanate comprises an aliphatic polyisocyanate.

10. The process of claim 9 wherein said chain extender comprises ethylene glycol or 1,4-butanediol.

11. The process of claim 10 wherein the reaction of the polyether and the polyisocyanate is conducted at an elevated temperature in the presence of an organotin and/or tertiary amine catalyst.

12. The process of claim 11 wherein the reaction of the prepolymer or quasi-prepolymer is reacted with the chain extender at an elevated temperature in the presence of an organotin and/or tertiary amine catalyst.

13. The process of claim 12 wherein the polyether has an average equivalent weight of about 800–2500.

14. The process of claim 13 wherein the polyether is an ethylene oxide-capped poly(propylene oxide).

15. The process of claim 2 wherein the tetraorganoboron or fluorinated alkyl sulfonate salt is a sodium or potassium salt of a perfluorinated $C_1$–$C_4$ perfluorinated alkyl sulfonic acid.

16. The process of claim 4 wherein the tetraorganoboron or fluorinated alkyl sulfonate salt is a sodium or potassium salt of a perfluorinated $C_1$–$C_4$ perfluorinated alkyl sulfonic acid.

* * * * *